United States Patent [19]
Abe

[11] Patent Number: 5,574,510
[45] Date of Patent: Nov. 12, 1996

[54] MULTI-COMPONENT VIDEO SIGNAL MIXER

[75] Inventor: Masanori Abe, Kanagawa, Japan

[73] Assignee: Sony Corporation, Tokyo, Japan

[21] Appl. No.: 403,324

[22] Filed: Mar. 14, 1995

[30] Foreign Application Priority Data

Mar. 18, 1994 [JP] Japan ................................. 6-049576

[51] Int. Cl.⁶ ............................ H04N 5/265; H04N 5/275
[52] U.S. Cl. .................................. 348/584; 348/591
[58] Field of Search .............................. 348/599, 598, 348/597, 593, 591, 592, 590, 588, 586, 584, 659, 600, 589, 687, 679, 649, 648, 647; H04N 5/265, 5/272, 5/275

[56] References Cited

U.S. PATENT DOCUMENTS

| | | | |
|---|---|---|---|
| 4,611,233 | 9/1986 | Tanno ................................. | 358/160 |
| 4,713,695 | 12/1987 | Macheboeuf ......................... | 358/183 |
| 4,947,255 | 8/1990 | Jackson et al. ....................... | 358/183 |
| 5,121,210 | 6/1992 | Hirayama ............................. | 358/183 |
| 5,426,467 | 6/1995 | Moriwabe et al. ..................... | 348/584 |

FOREIGN PATENT DOCUMENTS 0518465  4/1992  European Pat. Off. .

*Primary Examiner*—Safet Metjahic
*Attorney, Agent, or Firm*—William S. Frommer; Alvin Sinderbrand

[57] ABSTRACT

A video signal mixing device for mixing a first video signal including at least a mutually related first signal component and second signal component and a second video signal which is made up of at least a mutually related first signal component and second signal component, for each of those signal components, the video signal mixing circuit including a differential signal producing means for obtaining a differential signal showing a difference of values of the first signal component of the first video signal and the first signal component of the second video signal and a mixer for mixing the second signal component of the first video signal and the second signal component of the second video signal by a mixing ratio determined based on the differential signal.

8 Claims, 4 Drawing Sheets

FIG. 4A  YA
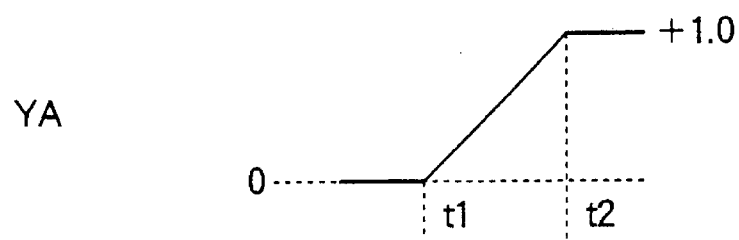
FIG. 4B  YB
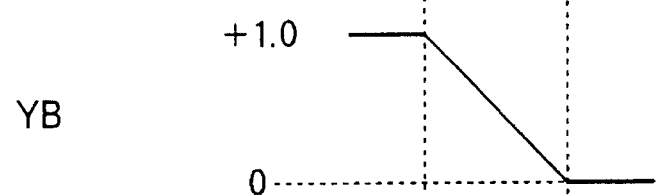
FIG. 4C  YA−YB
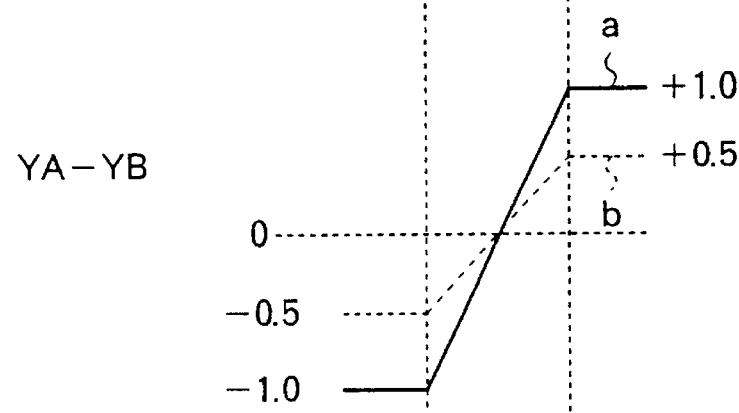
FIG. 4D  LIM
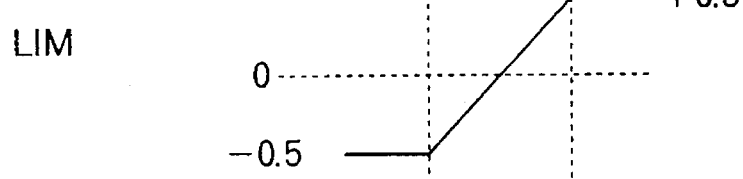
FIG. 4E  K

MULTI-COMPONENT VIDEO SIGNAL MIXER

FIELD OF THE INVENTION

The present invention relates to a video signal mixing device for mixing video signals.

BACKGROUND OF THE INVENTION

In mixing of video signals to produce one edited video signal from two or more video signal sources, a method known as non-additive mixing (NAM) is sometimes adopted. An explanation will be made of non-additive mixing of video signals below.

In non-additive mixing, comparison is made to the values of the luminance signals Y of for example two video signals each containing component signals, for example, a luminance signal Y and two color difference signals U and V or a luminance signal Y and two color difference signals $P_B$ and $P_R$, selection is made of the video signal having a luminance signal Y with the larger value. This is typically called a positive NAM. Conversely, there is known a method of selectively outputting the video signal giving a luminance signal Y with a smaller value and mixing the video signals. This is called as a negative NAM.

In the NAM processing of video signals, when two video signals to be mixed have a predetermined relationship, for example, when the values of the luminance signals Y of the two video signals are substantially the same, noise occurs in at least one of these luminance signals, and the color difference signals U and V (hue) of the two video signals are considerably different from each other, it suffers from the disadvantage that the resulting or deteriorated video signal is unnatural. This phenomenon typically derives from the fact that the relative magnitudes of the values of the luminance signals Y of each of the two video signals end up irregularly mixed by noise and, along with this, the other signal components, that is, the considerably mutually different color difference signals U and V of the two video signals also end up irregularly switched. The picture resulting from video signals where these two video signals are irregularly mixed ends up with noise occurring at part or all of the picture.

SUMMARY OF THE INVENTION

The video signal mixing circuit of the present invention was made in consideration of the above-mentioned disadvantages, and thus, an object of the present invention is to provide a video signal mixing circuit which alleviates the occurrence of unnaturalness in the picture, without a reduction the quality of the picture obtained as a result of mixing processing, even when mixing video signals containing noise.

To achieve the above object, the present invention provides a video signal mixing circuit for mixing a first video signal having a mutually related first signal component and second signal component, and a second video signal having a mutually related first signal component and second signal component, for each of those signal components, the video signal mixing circuit includes a differential signal producing means for generating a differential signal representing a difference of values between the first signal component of the first video signal and the first signal component of the second video signal, there is also provided a mixing means for mixing the second signal component of the first video signal and the second signal component of the second video signal by a mixing ratio determined based on the differential signal.

Preferably, the mixing means incoporates a limiter circuit which limits the level of the differential signal output to a predetermined range, a mixing circuit which mixes the second signal component of the first video signal and the second signal component of the second video signal by a mixing ratio determined based up on the output of the limiter circuit.

Preferably, the mixing means is further provided with a multiplication circuit between the limiter circuit the mixing circuit for multiplying the output of the limiter circuit by a predetermined factor a coefficient.

The video signal mixing circuit further comprises a non-additive mixing circuit which receives as an input a first signal component of the first video signal and a first signal component of the second video signal.

Preferably, the first component of the first video signal and the first signal component of the second video signal are each a luminance signal. The second signal component of the first video signal and the second signal component of the second video signal are preferably each two color difference signals.

Alternatively, the first video signal and second video signal may each include three baseband components. The first signal component of the first video signal and the first signal component of the second video signal are each a green signal, the second signal component of the first video signal and the second signal component of the second video signal are each a red signal and blue signal.

Alternatively, the first component of the first video signal and the first signal component of the second video signal are each a luminance signal while the second signal component of the first video signal and the second signal component of the second video signal are each a composite color difference signal.

BRIEF DESCRIPTION OF THE DRAWINGS

The above objects and features of the present invention will be more apparent from the following description of the preferred embodiments with reference to the accompanying drawings, wherein:

FIG. 4A is a graph of the luminance signal YA in the video signal mixing circuit shown in FIG. 3;

FIG. 4B is a graph of the luminance signal YB in the video signal mixing circuit shown in FIG. 3;

FIG. 4C is a graph of the signal of the difference of the values of the luminance signals YA and YB output from the subtracting circuit in the video signal mixing circuit shown in FIG. 3;

FIG. 4D is a graph of the output signal LIM of the limiter circuit in the video signal mixing circuit shown in FIG. 3; and FIG. 4E shows a mixing ratio K in the video signal mixing circuit shown in FIG. 3.

DESCRIPTION OF THE PREFERRED EMBODIMENTS

Figure 1:
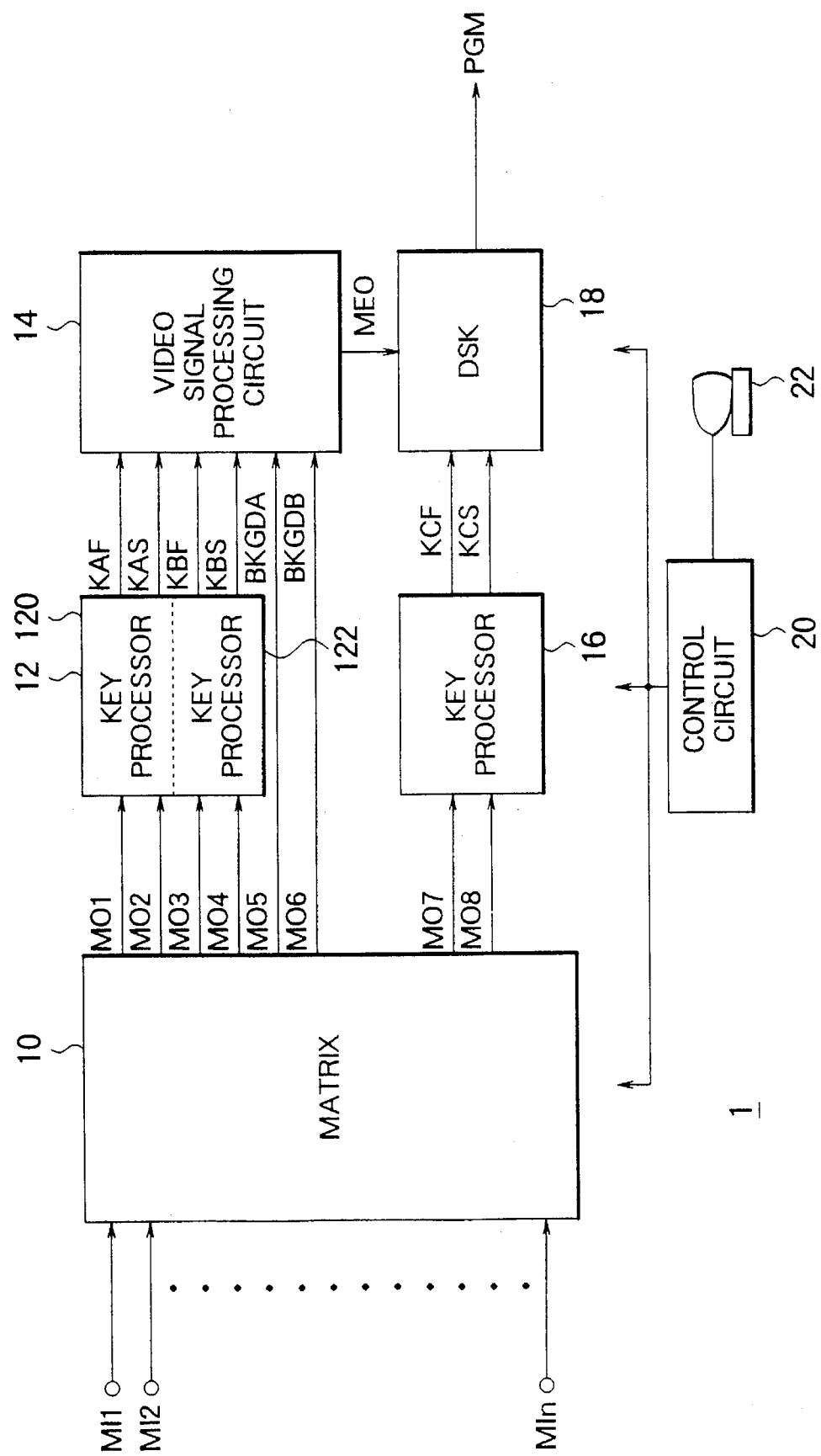
FIG. 1 is a block diagram of a video signal processor of an embodiment according to the present invention.
Figure 2:
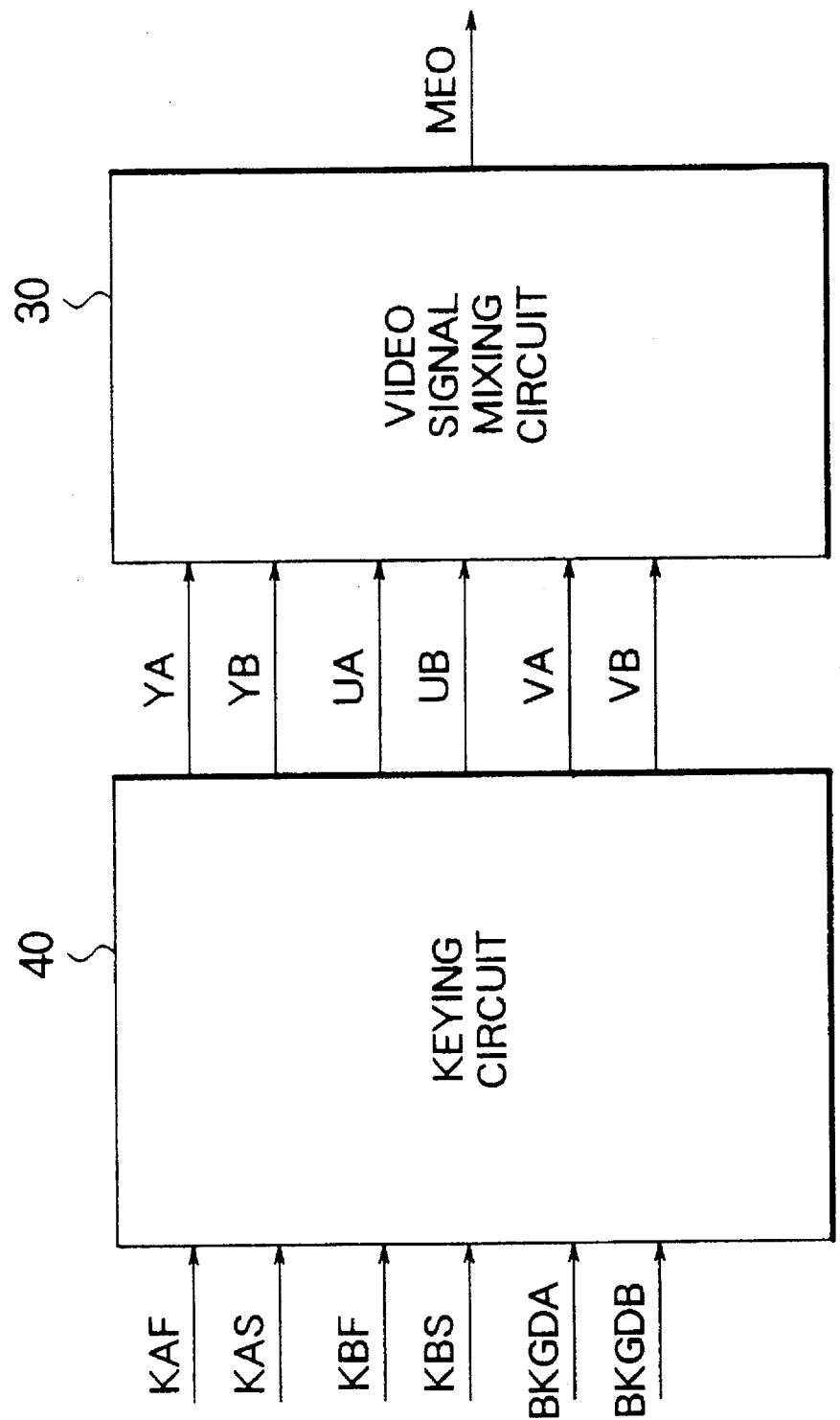
FIG. 2 is a detailed block diagram of the video signal processor shown in FIG. 1.

The present invention is directed to a circuit for mixing at least two video signals, each composed of a plurality of mutually related signal components. For each of the signal components there is provided a computing means for calculating the difference of values of first signal components constituting parts of the two video signals and a mixing means for mixing and outputting the other signal components constituting each of the two video signals by a mixing ratio corresponding to the difference of values of the first signal components calculated by the computing means.

The mixing means may mix and output the other signal components of the two video signals by a mixing ratio corresponding to the difference of values of the first signal components when the difference of values of the first signal components is within a predetermined range and output only the other signal component corresponding to the first signal component with the larger value when the difference of values of the first signal components is outside a predetermined range.

The mixing means may have a mixing ratio producing means for multiplying with the difference of first signal components a predetermined coefficient calculate the mixing ratio and for limiting the mixing ratio to a predetermined value when the value of the mixing ratio is out of a predetermined range.

There may be further provided a selecting means for selecting and outputting the one of the first signal components of the two video signals which has the larger value.

The two video signals may contain component signals as the signal components and the computing means may calculate the difference of the values of the major signal components of the component signals contained by the two video signals as the difference of values of the first signal components.

The component signals may be a luminance signal and two color difference signals and the first signal component may be the luminance signal.

Alternatively, the component signals may be a red signal, green signal, and blue signal and the first signal component may be, for example, a green color signal.

Or, the two video signals may contain composite signals as the signal components and the computing means may calculate the difference of the values of the major signal components of the composite signals contained by the two video signal components as the difference of values of the first signal components.

When giving as an example video signals containing a luminance signal Y and color difference signals U and V as major signal components, for example, component signals, contained by the video signals to be mixed, the controller (computing means) calculates the difference of the values of the luminance signals Y of the two video signals.

The mixer (mixing means) adaptively calculates (or controls) the mixing ratio corresponding to the difference of the values of the luminance signals Y that the computing means calculated. It mixes (adds) each of the two color difference signals U and V (hue) by this mixing ratio. For example, it mixes by a high mixing ratio the color difference signals U and V corresponding to the luminance signal Y with the larger value in proportion to the difference of the values of the luminance signals Y for example and mixes by a low mixing ratio the color difference signals U and V corresponding to the luminance signal with the smaller value.

By controlling the mixing ratio in this way, there is no sudden change in the color difference signals U and V (hue) even when the relative magnitudes of the values of the luminance signals Y are irregularly switched due to conditions of the luminance signals Y of the two video signals. Accordingly, even when the video signal obtained by the mixing is converted into a picture, it does not appear unnatural.

The selecting means performs positive NAM processing to select the luminance signal Y with the larger value and output it as the luminance signal Y of the mixed video signal.

Further, when necessary, the mixing means is made to mix the color difference signals U and V by a mixing ratio corresponding to the difference of the values of the luminance signals Y only when the difference of the values of the luminance signals Y is within a predetermined range and to output just the color difference signals U and V corresponding to the luminance signal Y with the larger value when out of this range. As a result, when the difference of the values of the luminance signals Y is sufficiently large, non-additive mixing (positive NAM) the same as in the past is performed. Further, in the region where the non-additive mixing is performed, there is never any rapid change in the color difference signals U and V, so when the mixed video signal is converted to a picture, it is possible to obtain a natural picture.

Further, the video signal mixing circuit of this invention can carry out processing in the same way too for video signals constituted by a red signal, green signal and blue signal (R, G and B signals) as component signals and for video signals constituted by composite signals (luminance signal Y and chroma signal C). In these cases, it is preferable to mix the video signals by a mixing ratio corresponding to the difference of the values of major signal components, namely, the signal components (luminance signals Y and green signals G) having the greatest effect on the brightness of the video signals among the various types of video signals.

Specific embodiments of this invention will be explained below with reference to FIG. 1 to FIGS. 4A to 4E.

Figure 3:
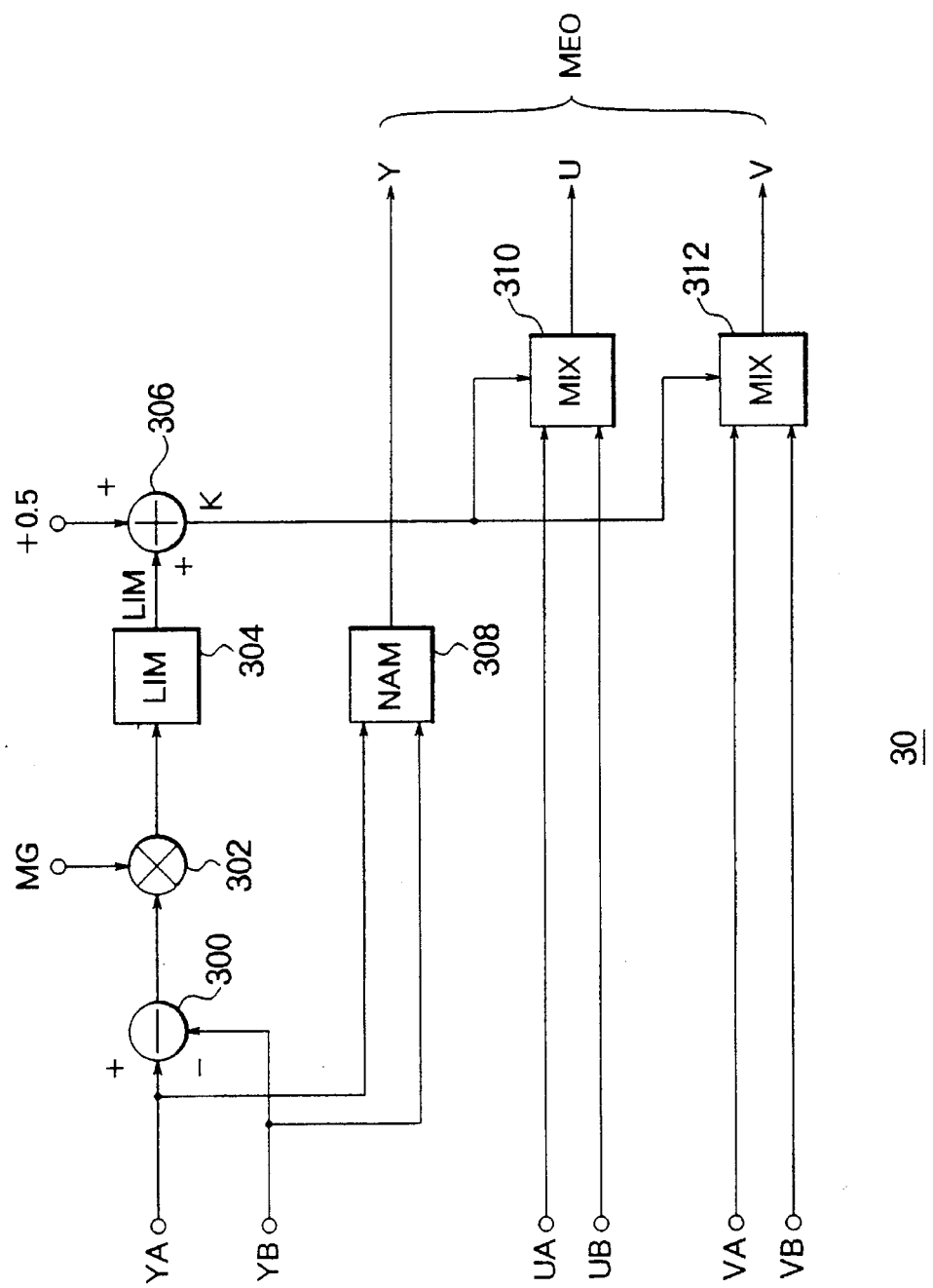
FIG. 3 is a detailed block diagram of the video signal mixing circuit shown in FIG. 2.

First, referring to FIG. 1, an explanation will be made of the configuration of a video signal processor 1 using a video signal mixing circuit 30 shown in FIG. 3. Note, a video signal processing circuit 14 in FIG. 1 consists of a keying circuit 40 and the video signal mixing circuit 30 shown in FIG. 2. The specific circuit of the video signal mixing circuit 30 is shown in FIG. 3.

The video signal processor 1 in which the video signal mixing circuit 30 is used performs by digital signal processing such processing as selection of any eight video signals from the digital format video signals applied to input terminals MI1 to MIn of a matrix circuit 10 for insertion of words and mixing of the video signals and outputs the processed results as the program output PGM.

In FIG. 1, the matrix circuit 10 is comprised by switches connected in a matrix. Under the control of a control circuit 20, following operation information input by an operator from an operation input circuit 22, any eight of the n number of video signals input from the input terminals MI1 to MIn may be output from any of output terminals MO1 to MO8 to two key processors 12 and 16, and the image processing circuit 14 mentioned above.

Note that the video signals that are input into the video signal processor 1, more specifically, the matrix circuit 10, are constituted for example by component video signals, for example, the luminance signal Y and color difference signals U and V, there signals are processed individually in the video signal processor 1.

The key processor 12 is constituted by a first key processor 120 and a second key processor 122. The first and second key processors 120 and 122 produce and input to the image processing circuit 14 first and second key signals KAS and KBS which represent the relative positions for fitting in the other video signals in predetermined parts of the video signals applied to the input terminals MI1 to MI4 of the matrix circuit 10 and the video signals KAF and KBF showing video signals fit into the positions indicated by the key signals.

The image processing circuit 14 is provided with the keying circuit 40 which receives as input the signals KAS, KAF, KBS, and KBF from the key processor 12 and the signals BKGDA, BKGDB from the matrix circuit 10 and the video signal mixing circuit 30 which mixes the video signals based on the signal supplied from the keying circuit 30. The keying circuit 40 produces the luminance signal YA, a first color difference signal UA, and color difference signal VA from the signal KAF or the signal BKGDA and produces the luminance signal YB, color difference signal UB, and color difference signal VB from the signal KBF or signal BKGDB.

The output of the video signal mixing circuit 30 is input to a downstream keyer 18 as the signal MEO.

The configuration of the video signal mixing circuit 30 is discussed later with reference to FIG. 3. Note that among these signals, mainly video signals of a background image are input as the signals BKGDA and BKGDB.

The third key processor 16 carries out processing similar to the key processor 12. In other words, based on the video signals applied from the output terminals MO7 to MO8 of the matrix circuit 10, it produces the key signal KCS and the video signal KCF showing the picture fit at the location indicated by the key signal and inputs the same to the downstream keyer 18. Note that the key processor 16 mainly handles video signals for words.

The downstream keyer 18 uses the key signal KCS to fit the video signal KCF in the signal MEO and outputs the result as the program output signal PGM.

The control circuit 20 controls the operation of the individual components of the video signal processor 1 according to operation information input by the operator from the operation input circuit 22.

Below, an explanation is made of the configuration of the video signal mixing circuit 30 referring to FIG. 3.

As shown in FIG. 3, the luminance signals YA and YB are input into a subtracting circuit 300 and a non-additive mixing circuit (NAM) 308, respectively, the color difference signal UA and color difference signal VA are input into a first mixing circuit 310, and the color difference signal UB and color difference signal VB are input into a second mixing circuit 312.

The subtracting circuit 300 subtracts the value of the second luminance signal YB from the value of the first luminance signal YA and outputs the result of the subtraction (difference) to a multiplication circuit 302. When the luminance signals YA and YB are expressed with the range of possible values normalized to the range of 1 to 0, the value of the result of subtraction becomes the range of −1 to +1. Below, an explanation will be made of the processing at the different portions of the video signal mixing circuit 30 using the normalized numerical figures shown here.

The multiplication circuit 302 multiplies the value of the mixing gain MG, where $0<MG\leq 1$, established by the control circuit 20 in accordance with the operation information that was input by the operator from the operation input circuit 22 by the result of subtraction input from the subtracting circuit 300 and outputs the result of the multiplication to a limiter circuit 304. The mixing gain MG will be explained later with reference to FIGS. 4A to 4E.

The limiter circuit 304 limits the result of the multiplication input from the multiplication circuit 302 to for example a predetermined range, for example, in this embodiment, a threshold of ±0.5, and outputs the result as the signal LIM to an addition circuit 306.

The addition circuit 306 adds to the signal LIM input from the limiter circuit 304 a predetermined coefficient (offset value) so that the center of the mixing ratio K becomes 0, in this embodiment, adds +0.5, and inputs the result to the mixing circuits 310 and 312 as the mixing ratio K. That is, the mixing ratio K is produced adaptively to the difference of the values of the luminance signals YA and YB in the range of $0\leq K\leq 1$.

The NAM circuit 308 compares the values of the luminance signals YA and YB input, selects the one with the larger value, and outputs this as processed luminance signal Y.

The mixing circuit 310 performs the computation of the following equation 1 based on the color difference signals UA and UB and the mixing ratio K input from the addition circuit 306 and outputs the result as the mixed color difference signal U.

$$U = K \times UA + (1-K) \times UB \quad (1)$$

The mixing circuit 312 performs the computation of the following equation 2 based on the color difference signals VA and VB and the mixing ratio K input from the addition circuit 306 and outputs the result as the mixed color difference signal V.

$$V = K \times VA + (1-K) \times VB \quad (2)$$

The luminance signal Y output from the NAM circuit 308 and the color difference signals U and V output by the mixing circuits 310 and 312 are output from the video signal mixing circuit 30 (image processing circuit 14) as the signal MEO to the downstream keyer 18.

Below, an explanation will be made of the operation of the video signal processor 1 and video signal mixing circuit 30 referring to FIG. 1 to FIGS. 4A to 4E.

FIGS. 4A to 4E are views illustrating signals of the different parts of the video signal mixing circuit 30 shown in FIG. 3, wherein FIG. 4A shows the change in value of the luminance signal YA, FIG. 4B shows the change in value of the luminance signal YB, FIG. 4C shows the waveform of the difference of the values of the luminance signals YA and YB output from the subtracting circuit 300 shown in FIG. 3, FIG. 4D shows the waveform of the signal LIM output by the limiter circuit 304 shown in FIG. 3, and FIG. 4E shows the waveform of the mixing ratio K output from the addition circuit 306 shown in FIG. 3. Note that in actuality, these signals are signals of a digital format, but for convenience of illustration FIGS. 4A to 4E shows the waveforms of the case of conversion of these signals to analog format signals.

Eight of the digital format video signals applied to the terminals MI1 to MIn (where, n=8 in this case) of the matrix circuit 10 are output from any of the output terminals MO1 to MO8 by the matrix circuit 10.

The key processor 12 produces the signal KAS, KBS, KAF, and KBS from the video signals input from the terminals MO1 to MO4 and inputs these signals into the image processing circuit 14.

The key processor 16 produces the signals KCS and KCF from the video signals input from the terminals MO7, MO8 and inputs these signals into the downstream keyer 18.

The image processing circuit 14 receives as input the signals KAS, KBS, KAF, and KBS from the key processor 12 and the signals BKGDA and BKGDB output from the terminals MO5 and MO6 of the matrix circuit 10. The keying circuit 40 shown in FIG. 2 inputs two of theses signal into the video signal mixing circuit 30 as the luminance signals YA, YB and the color difference signals UA, UB, VA, VB shown in FIGS. 4A and 4B.

In the video signal mixing circuit 30, the difference (YA–YB) of the values of the luminance signals YA and YB, shown in FIG. 4C, is calculated by the subtracting circuit 300 and the difference (YA–YB) of the values of the luminance signals YA and YB is output to the multiplication circuit 302.

In the multiplication circuit 302, the mixing gain MG is multiplied with the difference (YA–YB) of the luminance signals YA and YB input from the subtracting circuit 300. When the mixing gain MG is 1, the signal output from the multiplication circuit 302 becomes the waveform shown by the solid line a of FIG. 4C, while when the mixing gain MG is for example 0.5, the mixing gain MG becomes the waveform shown by the dotted line b of FIG. 4C.

The result of the multiplication of the multiplication circuit 302 is input into the limiter circuit 304, where it is limited to the range of −0.5 to +0 and becomes the signal LIM shown in FIG. 4D. The signal LIM is input to the addition circuit 306, where the coefficient 0.5 is added. The result is output to the mixing circuits 310 and 312 as the mixing ratio K which takes a value in the range of 0 to 1 shown in FIG. 4E.

The mixing circuits 310 and 312 perform the computations of the equation 1 and equation 2 on the input color difference signals UA and UB and color difference signals VA and VB using the mixing ratio K and output the results of the computations to the downstream keyer 18 as the color difference signals U and V of the signal MEO.

The NAM circuit 308 selects whichever of the input luminance signals YA and YB is larger in value and outputs it to the downstream keyer 18 as the luminance signal Y of the signal MEO.

Here, in the multiplication circuit 302, when the mixing gain MG is made a range of 1 to 0.5, the mixing ratio K can take a value of 1 and 0. In the range where the mixing ratio K is 1, the color difference signals U and V of the signal MEO become equal to the color difference signals UA and VA, while in the range where the mixing ratio K is 0, the color difference signals U and V of the signal MEO become equal to the color difference signals UB and VB. In other words, the video signal mixing circuit 30 operates as a non-additive mixing circuit (positive NAM) in the range where the mixing ratio K becomes 1 or 0 and operates as an additive mixing circuit outside of the range where the mixing ratio K becomes 1 or 0. Conversely, when the mixing gain MG is made the range of 0.5 to 0, the mixing ratio K cannot take the value of 1 or 0, so the video signal mixing circuit 30 operates as an additive mixing circuit over the entire range of the video signal.

Further, when the mixing gain MG is made a large value in the range of 1 to 0.5, the mixed video signal becomes a video signal with a clear boundary between the region where the color difference signals UA and VA are used and the region where the color difference signals UB and VB are used, while when the mixing gain MG is made a small value in the range of 1 to 0.5, it becomes a video signal with an unclear boundary between these regions.

Further, by changing the threshold value (±0.5) limiting the output signal of the multiplication circuit 302 in the limiter circuit 304 or by changing the coefficient added to the signal LIM in the addition circuit 306, it is possible to set a range of the mixing ratio K so that there is a region where the color difference signals U and V of the signal MEO output from the video signal mixing circuit 30 become equal to the color difference signals UA and VA, but there is no region where they become equal to the color difference signals UB and VB.

The signal MEO output from the video signal mixing circuit 30 (a part of the image processing circuit 14) is input into the downstream keyer 18.

The downstream keyer 18 fits the signals KCF and KCS, for example, showing words, input from the key processor 16, into the input signal MEO and outputs the result as the signal PGM to the video signal processor 1.

According to this video signal mixing circuit 30, even when the values of the luminance signals Y of two video signals are almost equal and there is noise in at least one, there is no unnaturalness in the picture of the video signal obtained by mixing these two video signals.

Further, by changing the setting of the mixing gain MG in the multiplication circuit 302 through the operation input circuit 22 and the control circuit 20 or by changing the setting of the value of the coefficient added to the signal LIM in the addition circuit 306, it is possible to give to the picture effects which could not be realized by conventional non-additive mixing circuits.

In addition, the circuits to be added to the video signal mixing circuit are small in size despite these features being enjoyed.

While the invention has been described by reference to the specific embodiments chosen for purposes of illustration, it should be apparent that numerous modifications could be made thereto by those skilled in the art without departing from the basic concept and scope of the invention.

For example, this embodiment concerned mixing processing of video signals containing a luminance signal Y and color difference signals U and V as component signals, but it is also possible to perform mixing processing on video signals containing a red signal, green signal, and blue signal (R, G and B signals) as component signals. In the video signal mixing circuit 30, when performing mixing processing on two video signals containing R, G, and B signals, the green (G) signals of the two video signals may be input instead of the luminance signals YA and YB and the red (R) signals and blue (B) signals of the two video signals may be input into the video signal mixing circuit 30 instead of the color difference signals UA and UB and color difference signals VA and VB. The effects which each of the R, G and B signals have on the brightness (W) of the picture are shown in the following equation. This is because the G signal, which has the greatest effect on the brightness W of the picture, should be used as the main signal corresponding to the luminance signal Y in this embodiment.

$$W = 0.30R + 0.59G + 0.11B \tag{3}$$

Further, in the same way, the video signal mixing circuit 30 can mix video signals containing as component signals a luminance signal Y and color difference signals PB and PR without changing the configuration.

Further, the video signal mixing circuit 30 can perform mixing processing of video signals containing luminance signals Y and chroma signals C comprised of composite signals.

In this case, the luminance signals Y of the two video signals are input into the video signal mixing circuit 30 as the luminance signals YA and YB and the chroma signals C of the two video signals are input into the mixing circuit 310 as the color difference signals UA and UB. Signals are not input into the mixing circuit 312.

Further, in this embodiment, the mixing operation of the video signals in the video signal mixing circuit 30 is performed by circuits performing digital computations such as the subtracting circuit 300, multiplication circuit 302, limiter circuit 304, adder 306, NAM circuit 308, and mixing circuits 310 and 312, but these circuits can be replaced by analog circuits performing similar operations. Further, the steps of the operation for the mixing processing in the video signal mixing circuit 30 were shown performed by hardware, but similar operations can be realized by computer software as well.

Further, the video signal mixing circuit 30 was configured so as to add a predetermined coefficient to the limited signal LIM by the addition circuit 306, but this was for convenience in explanation in making the mixing ratio K a value in the range of from 0 to 1. The addition circuit 306 is not an essential requirement of the video signal mixing circuit 30.

Further, in the present embodiment, the NAM circuit 308 of the video signal mixing circuit 30 was configured to select the luminance signal YA or YB which has the larger value, that is, to perform positive NAM, but it may conversely be configured to select the luminance sisal YA or YB which has the smaller value, that is, to perform negative NAM. Further, in the present embodiment, the case was shown of the mixing gain MG being a positive value, but the mixing gain MG may be set to a negative value and the color signals UA, UB, VA, and VB corresponding to the luminance sisal YA or YB with the smaller value may be mixed at a high mixing ratio. Further, the value of MG is not limited to 0 to 1 and may be over 1 as well. These changes may be realized by configuring the control circuit 20 to be able to control the NAM mixing circuit 308 and multiplication circuit 302 in accordance with operation information input by the operator from the operation input circuit 22.

Further, this embodiment was configured so that the luminance signals YA and YB were simply compared in the NAM circuit 308 and the one with the larger value was selected and output, but it is also possible to give the comparison processing at the NAM circuit 308 a predetermined hysteresis characteristic and to raise the resistance to noise.

In addition to the configuration shown in the embodiments, the video signal mixing circuit of the present invention may have various other configurations such as shown in the above-mentioned modifications for example.

What is claimed is:

1. A video signal mixing device for mixing a first video signal comprised of at least a mutually related first signal component and second signal component and a second video signal comprised of at least a mutually related first signal component and second signal component to produce a mixed video signal in which the second signal components are mixed independently of the mixing of the first signal components, said video signal mixing device comprising:

first mixing means for selecting the larger first signal component value from said first and said second video signals as the first component of said mixed video signal;

differential signal producing means for generating a differential signal representing a difference between values of said first signal component of said first video signal and said first signal component of said second video signal; and second mixing means for mixing said second signal component of said first video signal and said second signal component of said second video signal by a mixing ratio determined as a function of said differential signal to provide the second signal component of said mixed video signal.

2. A video signal mixing device as set forth in claim 1, wherein said second mixing means includes a limiter circuit for limiting the level of said differential signal to a predetermined range and a mixing circuit for mixing said second signal component of said first video signal and said second signal component of said second video signal by a mixing ratio determined as a function of the output of said limiter circuit.

3. A video signal mixing device as set forth in claim 2, wherein said second mixing means further includes an addition circuit for adding a predetermined coefficient to the output of said limiter circuit prior to supplying the same to said mixing circuit.

4. A video signal mixing device as set forth in claim 1, wherein said first signal component of said first video signal and said first signal component of said second video signal are each a luminance signal; and said second signal component of said first video signal and said second signal component of said second video signal are each two color difference signals.

5. A video signal mixing device as set forth in claim 1, wherein said first video signal and second video signal each include three baseband components;
said first signal component of said first video signal and said first signal component of said second video signal are each a green signal; and
said second signal component of said first video signal and said second signal component of said second video signal are each a red signal and blue signal.

6. A video signal mixing device as set forth in claim 1, wherein said first signal component of said first video signal and said first signal component of said second video signal are each a luminance signal; and said second signal component of said first video signal and said second signal component of said second video signal are each a composite color difference signal.

7. A video signal mixing device to produce a mixed video signal in which first signal components of first and second video signals are mixed independently of the mixing of second signal components of said first and second video signals, said video signal mixing device comprising:

differential signal generator for receiving said first signal component of said first video signal and the first signal component of said second video signal and generating a differential signal, said differential signal representing a difference between values of said first signal component of said first video signal and said first signal component of said second video signal, and wherein said differential signal generator includes a limiter for limiting the value of said differential signal to a predetermined range of values;

first signal mixer means for receiving the first signal component of both said first and second video signals and selecting the larger of the first signal components as a first component of said mixed video signal;

second signal mixer means for mixing the second signal component of said first video signal with the second signal component of said second video signal in accordance with a mixing ratio to provide a second component of said mixed video signal; and controller means for controlling the mixing ratio of said second signal mixer means as a function of said differential signal.

8. A video signal mixing device according to claim 7 wherein said first signal components of said first and second input video signals each comprise a video luminance signal; and said second signal components of said first and second input video signals each comprise a video color difference signal.

* * * * *